United States Patent
Chen et al.

(10) Patent No.: US 10,057,499 B1
(45) Date of Patent: Aug. 21, 2018

(54) AUTOMATIC EXPOSURE CONTROL CONVERGENCE PROCEDURE BY AUXILIARY CAMERA

(71) Applicant: MOTOROLA MOBILITY LLC, Chicago, IL (US)

(72) Inventors: Yin Hu Chen, Deerfield, IL (US); Valeriy Marchevsky, Glenview, IL (US); Susan Yanqing Xu, Westmont, IL (US)

(73) Assignee: Motorola Mobility LLC, Chicago, IL (US)

( * ) Notice: Subject to any disclaimer, the term of this patent is extended or adjusted under 35 U.S.C. 154(b) by 53 days.

(21) Appl. No.: 15/438,699

(22) Filed: Feb. 21, 2017

(51) Int. Cl.
  H04N 5/235   (2006.01)
  H04N 5/04    (2006.01)
  H04N 5/232   (2006.01)
  H04N 5/247   (2006.01)

(52) U.S. Cl.
  CPC ............ *H04N 5/2353* (2013.01); *H04N 5/04* (2013.01); *H04N 5/2356* (2013.01); *H04N 5/23293* (2013.01); *H04N 5/247* (2013.01)

(58) Field of Classification Search
  CPC .... H04N 5/2353; H04N 5/04; H04N 5/23293; H04N 5/2356; H04N 5/247; H04N 5/353
  See application file for complete search history.

(56) References Cited

U.S. PATENT DOCUMENTS

| | | | |
|---|---|---|---|
| 2008/0094486 A1 | 4/2008 | Fuh et al. | |
| 2010/0265342 A1* | 10/2010 | Liang | H04N 5/145 348/208.4 |
| 2012/0002082 A1 | 1/2012 | Johnson et al. | |
| 2015/0092066 A1 | 4/2015 | Geiss et al. | |
| 2015/0163414 A1* | 6/2015 | Nikkanen | H04N 5/353 348/229.1 |
| 2016/0227100 A1* | 8/2016 | Liu | H04N 5/232 |
| 2016/0301840 A1 | 10/2016 | Du et al. | |
| 2017/0163902 A1 | 6/2017 | Wu | |
| 2017/0201684 A1 | 7/2017 | Kang et al. | |
| 2017/0324906 A1 | 11/2017 | Kang et al. | |

OTHER PUBLICATIONS

Wang, Lizhi, et al., "High-speed Hyperspectral Video Acquisition with a Dual-camera Architecture", IEEE Conference on Computer Vision and Pattern Recognition (CVPR), 2015.

(Continued)

*Primary Examiner* — Nicholas G Giles
(74) *Attorney, Agent, or Firm* — Yudell Isidore PLLC

(57) ABSTRACT

An electronic device, computer program product and method provide automatic exposure control (AEC) convergence in a dual camera system. A main camera is triggered to perform AEC convergence procedure at a first frame rate. A display presents at least one of first images from the main camera. An auxiliary camera is triggered to perform AEC convergence procedure. A determination is made whether the AEC of the auxiliary camera has converged. In response convergence by the AEC, an exposure setting of the main camera is synchronized to the exposure setting of the auxiliary camera. The display presents a next image captured by the main camera operating with the synchronized exposure settings.

16 Claims, 8 Drawing Sheets

(56) References Cited

OTHER PUBLICATIONS

Bagheri, Saeid et al., U.S. Appl. No. 15/476,729, filed Mar. 31, 2017, The United States Patent and Trademark Office.
Chen, Yin-Hu et al., U.S. Appl. No. 15/398,532, filed Jan. 4, 2017, The United States Patent and Trademark Office.
Chen, Yin-Hu et al., U.S. Appl. No. 15/353,435, filed Nov. 16, 2016, The United States Patent and Trademark Office.
Chen, Yin-Hu et al., U.S. Appl. No. 15/354,501, filed Nov. 17, 2016, The United States Patent and Trademark Office.
Chen, Yin-Hu, et al., U.S. Appl. No. 15/441,085, filed Feb. 23, 2017, The United States Patent and Trademark Office.
Chen, Yin-Hu, et al., U.S. Appl. No. 15/459,621, filed Mar. 15, 2017, The United States Patent and Trademark Office.
Li, Dalong, et al., U.S. Appl. No. 15/013,232, filed Feb. 2, 2016, The United States Patent and Trademark Office.
Li, Qiaotian, et al., U.S. Appl. No. 15/464,118, filed Mar. 20, 2017, The United States Patent and Trademark Office.
Matsimanis, Peter, et al., U.S. Appl. No. 15/435,503, filed Feb. 17, 2017, The United States Patent and Trademark Office.
Musatenko, Yuriy, et al., U.S. Appl. No. 15/349,948, filed Nov. 11, 2016, The United States Patent and Trademark Office.
Ho, Tuan V., Non-Final Office Action, U.S. Appl. No. 15/464,118, The United States Patent and Trademark Office, dated Feb. 23, 2018.
Pasiewicz, Daniel M., Non-Final Office Action, U.S. Appl. No. 15/354,501, The United States Patent and Trademark Office, dated Mar. 15, 2018.

\* cited by examiner

AUTOMATIC EXPOSURE CONTROL CONVERGENCE PROCEDURE BY AUXILIARY CAMERA

TECHNICAL FIELD

The present disclosure generally relates to automatic exposure control (AEC) of camera devices and more particularly faster AEC convergence procedure of camera devices.

BACKGROUND

Electronic devices such as smart phones can suffer by being in bright light or low light during a scene change or during a camera launch. While in these conditions, a default or current setting for automatic exposure control (AEC) of the camera will generally result in an overblown image or a dark image, respectively, for a humanly perceptible period of time until the AEC settings converge. These overblown or dark images are particularly captured when taking videos. Other automatic camera control settings that depend on AEC, such as automatic white balance (AWB), are also delayed by slow AEC convergence. White balance in digital photography means adjusting colors so that the image looks more natural. In particular, AWB needs AEC to settle first in order for AWB to get proper exposure index or lux index for different light source weighting interpolations.

For camera launch or activation among different light intensities, different exposure integration times should ideally be used for fast convergence. Thus, for bright light condition, a short exposure should be used to avoid the image being overblown. For low light, a long exposure should be used to avoid a dark image. However, the generally-known camera only knows light condition (bright or dim) after camera launch from referencing statistics ("stats") collected by the camera. Thus, generally-known cameras using one fixed initial value that is subsequently tunable when launching the camera suffer the overblown or dark pictures issue. For a generally-known camera chipset, the AEC convergence employs a system of adjusting the exposure after two or three frames to allow time for the previous setting to take effect. With commonly experienced lighting conditions, these chipsets need at least 18 frames to converge, with some scenes requiring more than 30 frames to converge. Speeding up the frame rate to reduce the AEC convergence time is generally not a satisfactory solution since the current camera image is previewed on a user interface (UI). The high frame rate limits the amount of digital image processing that can be accomplished for each frame and less sensor integration time, resulting in a low-quality image. Thus generally-known electronic devices experience slow AEC convergence at camera launch that impacts a key performance indicator (KPI) of camera launch to readiness and overblown or dark preview pictures during scene change under different light intensities, which negatively impact user experience.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
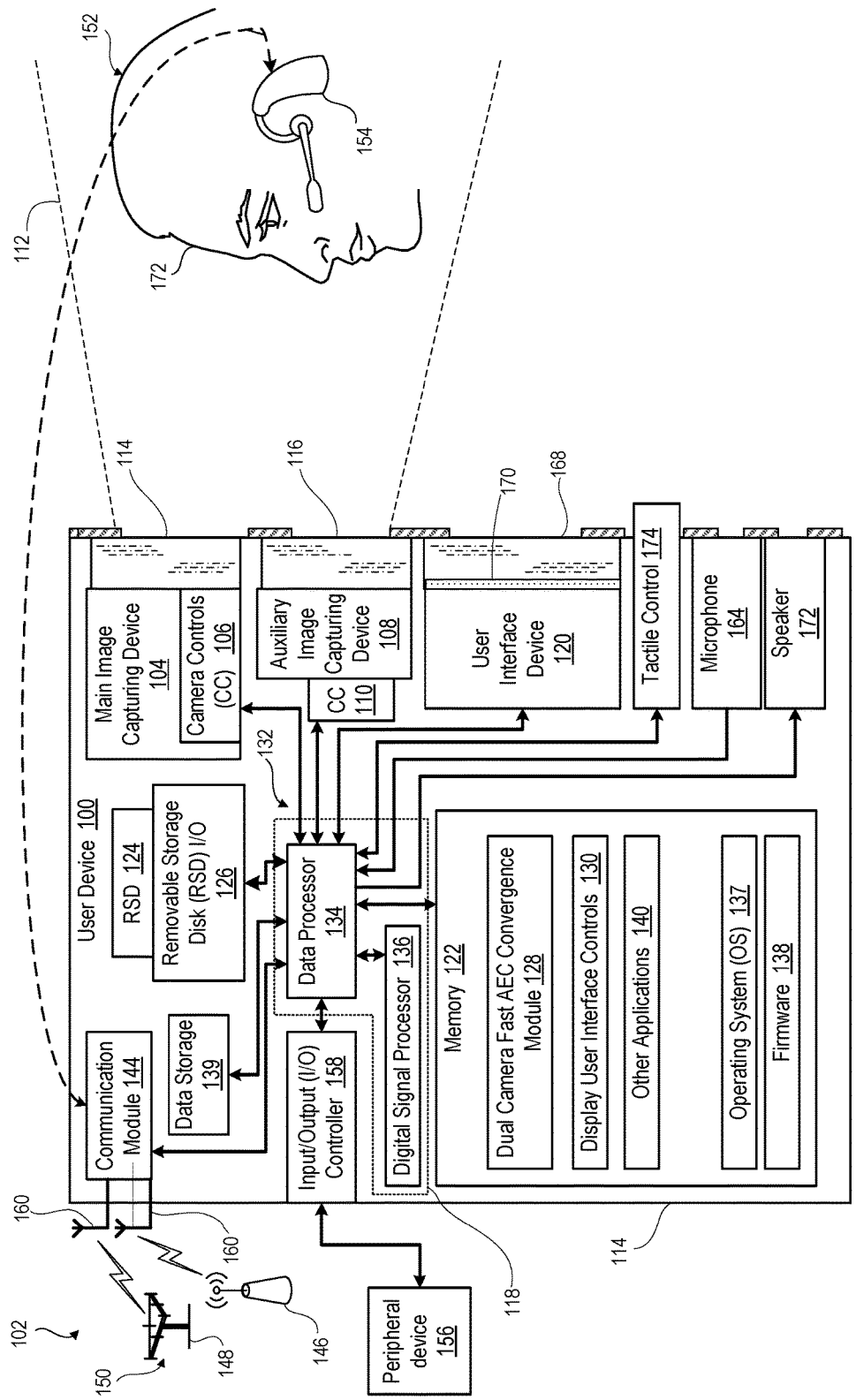
FIG. 1 illustrates a simplified block diagram of an electronic device having dual cameras within which certain aspects of the disclosure can be practiced, in accordance with one or more embodiments.

According to aspects of the present innovation, automatic exposure control (AEC) convergence is improved in an electronic device having dual cameras. One camera operates at a normal frame rate that can be previewed by a user interface (UI) while another camera is operating at a very high frame per second (FPS) rate to quickly converge on the appropriate exposure settings. Then these settings are shared with the other camera.

In one or more aspects of the present disclosure, a method includes triggering a main camera to perform an AEC convergence procedure at a first frame rate. The method includes activating the main camera to provide at least one first image captured at the first frame rate. The method includes presenting at least one of the first images from the main camera on a display. The method includes triggering an auxiliary camera to perform AEC convergence procedure at a second frame rate that is faster than the first frame rate. The method includes determining whether the AEC of the auxiliary camera has converged. In response to determining that the AEC of the auxiliary camera has converged, the method includes synchronizing an exposure setting of the main camera to the exposure setting of the auxiliary camera. The method includes presenting a next image captured by the main camera operating with the synchronized exposure setting.

In one or more aspects of the present disclosure, an electronic device includes a main camera having a first field of view and controlled by a main camera control. The main camera control initially performs an AEC convergence procedure at a first frame rate in response to receiving a trigger. The main camera control activates the main camera to provide at least one first image captured at the first frame rate. The electronic device includes an auxiliary camera having a similar field of view as the main camera and controlled by an auxiliary camera control. The auxiliary camera control performs AEC convergence procedure at a second, faster frame rate in response to receiving a next trigger. The electronic device includes a display on which the at least one image captured by the main camera is presented. The electronic device includes a processor subsystem in communication with the display, the main camera control, and the auxiliary camera control. The processor subsystem executes a dual camera control module, which causes the processor subsystem to trigger the main camera control to perform AEC convergence procedure at the first frame rate. The dual camera control module causes the processor subsystem to present the at least one first image on the display. The dual camera control module causes the processor subsystem to trigger the auxiliary camera control to perform AEC convergence procedure at the second frame rate that is faster than the first frame rate. The dual camera control module causes the processor subsystem to access current frame statistics generated by performing AEC by the auxiliary camera control. The dual camera control module causes the processor subsystem to determine whether the AEC of the auxiliary camera control has converged, based on the current frame statistics. The statistics include an exposure setting. In response to determining that the AEC of the auxiliary camera control has converged, the dual camera control module causes the processor subsystem to synchronize an exposure setting of the main camera control to the exposure setting of the auxiliary camera, so that the main camera captures a next image while operating with the synchronized exposure settings. The processor subsystem presents, on the display, a next image captured by the main camera operating with the synchronized exposure setting.

In one or more aspects of the present disclosure, a computer program product includes a computer readable storage device having stored thereon program code for a dual camera control module. When executed by a processor associated with an electronic device having a main camera and at least one auxiliary camera, the program code on the computer readable storage device enables the electronic device to provide certain functionality. The functionality includes triggering a main camera to perform AEC convergence procedure at a first frame rate. The main camera is activated to provide at least one first image captured at the first frame rate. At least one of the first images from the main camera is presented on a display. An auxiliary camera is triggered to perform AEC convergence procedure at a second frame rate that is faster than the first frame rate. A processor determines whether the AEC of the auxiliary camera has converged. In response to determining that the AEC of the auxiliary camera has converged, the processor synchronizes an exposure setting of the main camera to an exposure setting of the auxiliary camera. The display presents a next image captured by the main camera operating with the synchronized exposure settings.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within an electronic device are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Turning now to FIG. 1, there is depicted a block diagram representation of an example electronic device, and specifically user device 100, within which several of the features of the disclosure can be implemented. User device 100 can be one of a host of different types of devices, including but not limited to, a mobile cellular phone or smart-phone, a laptop, a net-book, an ultra-book, and/or a tablet computing device. User device 100 may be portable or fixed. In an exemplary aspect, user device 100 includes the hardware and software to support various wireless or wired communication functions as part of a communication system 102. According to the general illustration, user device 100 includes main image capturing device 104, such as a digital camera, that has main camera controls 106 that perform functions such as an AEC convergence procedure. An auxiliary image capturing device 108, such as a digital camera, has auxiliary camera controls (CC) 110 that also perform functions such as an AEC convergence procedure. Auxiliary image capturing device 108 shares at least a portion of a field of view (FOV) 112 of main image capturing device 104. Main image capturing device 104 and auxiliary image capturing device 108 can have the same or different image quality (IQ) hardware and software capabilities. For example, a fixed or variable lens 114 of main image capturing device 104 can have a different focal length or range of zoom than a fixed or variable lens 116 of auxiliary image capturing device 108.

Image quality differences can arise from one or more of the following aspects:

(i) sharpness (e.g., lens distortion, lateral chromatic aberration, data compression losses, etc.);

(ii) noise (e.g., uniformity, lens flare (veiling glare), Dmax (deepest black tone));

(iii) color accuracy (e.g., ISO sensitivity, artifacts, texture detail, etc.); and (iv) other factors (dynamic range (DR), tonal response, contrast, exposure accuracy, blemishes/sensor defects, color moiré, color gamut, etc.).

A processor subsystem 118 can trigger the main and auxiliary camera controls 106, 110 to perform certain functions or to use certain settings. Processor subsystem 118 can use images taken by one or both of the main and auxiliary image capturing devices 104, 108, such as for previewing on a user interface device 120. Processor subsystem 118 can store images in memory 122 for further processing or recording in a computer-readable medium, such as a removable storage device (RSD) 124 that is received in an RSD input/output (I/O) interface 126. Processor subsystem 118 executes applications contained in memory 122. Examples of these applications include dual camera fast convergence module 128 and display user interface (UI) camera controls 130.

Referring now to the specific component makeup and the associated functionality of the presented components, processor subsystem 118 can be an integrated circuit (IC) that connects, via a plurality of bus interconnects 132, to a plurality of functional components of user device 100. Processor subsystem 118 can include one or more programmable microprocessors, such as data processor 134 and digital signal processor (DSP) 136, which may both be integrated into a single processing device, in some embodiments. Processor subsystem 118 controls the communication, user interface, and other functions and/or operations of user device 100. These functions and/or operations thus include, but are not limited to, application data processing and signal processing. The user device 100 may use hardware component equivalents such as special purpose hardware, dedicated processors, general purpose computers, microprocessor-based computers, micro-controllers, optical computers, analog computers, dedicated processors and/or dedicated hard wired logic. Connected to processor subsystem 118 is memory 122, which can include volatile memory and/or non-volatile memory. Memory 122 stores software, such as operating system 137, as well as firmware 138. One or more other executable applications 140 can be stored within memory 122 for execution by processor subsystem 118. Memory 122 may include on-device data storage 139, which can be augmented by the RSD I/O interface 126 that receives the RSD 124.

According to the illustrative embodiment, user device 100 supports wireless communication via a communication module 144. For example, user device 100 may support communication protocols and transceiver radio frequencies appropriate for a wireless local area network (WLAN), illustrated as node 146, a radio access network (RAN) 148 of a wireless wide area network (WWAN) or cellular network 150, and a near field or personal access network (PAN) 152. The PAN network 152 can be established between the user device 100 and another nearby peripheral device, illustrated as a BLUETOOTH headset device 154. In certain embodiments, user device 100 may also support a hardwired local access network (LAN) (not shown) or peripheral devices 156 via an I/O controller 158. User device 100 can communicate via antennas 160 to RAN 148, cellular network 150, and PAN 152. While shown with the components to support operation as a wireless communication device, it is appreciated that, in alternate embodiments, user device 100 can be any dual camera device configured to provide the dual camera fast convergence functionality described herein.

User device 100 includes input and output devices. For example, microphone 164 receives user audible inputs. User interface device 120 can present visual or tactile outputs as well as receive user inputs. In one example, user interface device 120 can include a touch screen 168 that is embedded within or associated with display 170. An audio speaker 172 can augment or provide alternate presentation of the visual or tactile outputs of user interface device 120. A tactile control 174 can provide an interface such as for braille reading or manual inputs.

Figure 3:
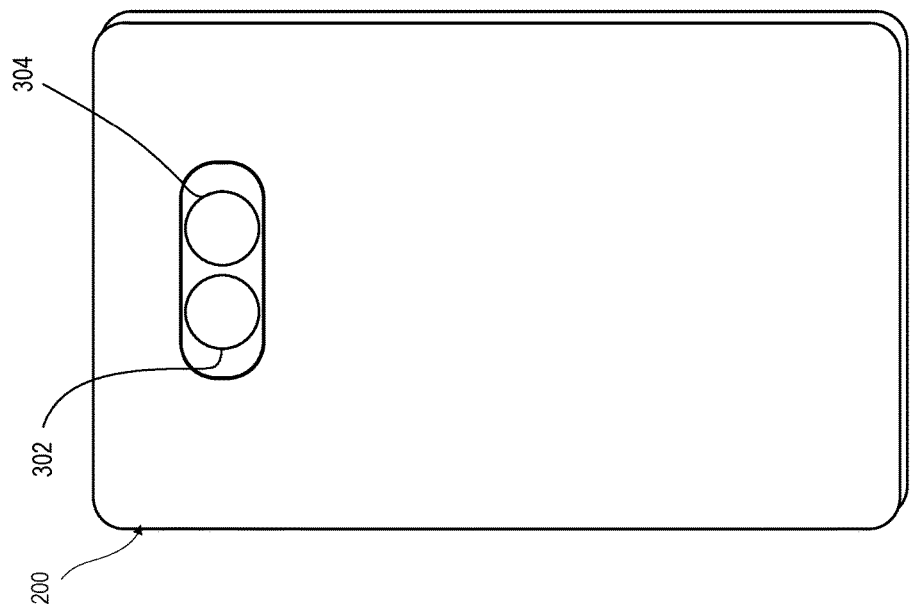
FIG. 3 illustrates a back view of the example electronic device of FIG. 2, in accordance with one or more embodiments.
Figure 2:
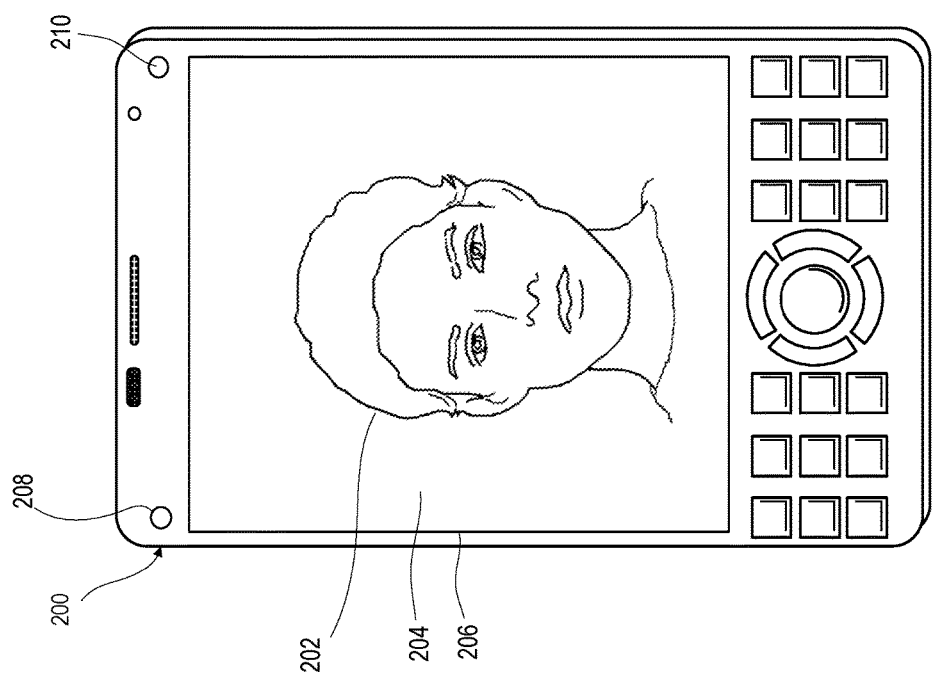
FIG. 2 illustrates a front view of an example electronic device, in accordance with one or more embodiments.

FIG. 2 illustrates an example user device 200 presenting a preview image 202 within a UI 204 presented on/via a user interface device 206. The preview image 202 is taken at a normal frame rate by a main camera 208. Concurrently, an auxiliary camera 210 co-located at a same directional view is made to perform fast AEC convergence procedure at a fastest frame rate. FIG. 3 illustrates the user device 200 having back side main and auxiliary cameras 302, 304 that can perform AEC convergence procedure and provide images. In one or more embodiments, the user device 200 can include both front side main and auxiliary cameras 208, 210 and back side main and auxiliary cameras 302, 304. Fast convergence procedure is performed for whichever main camera 208, 302 is being actively used to provide preview image 202.

Figure 4:
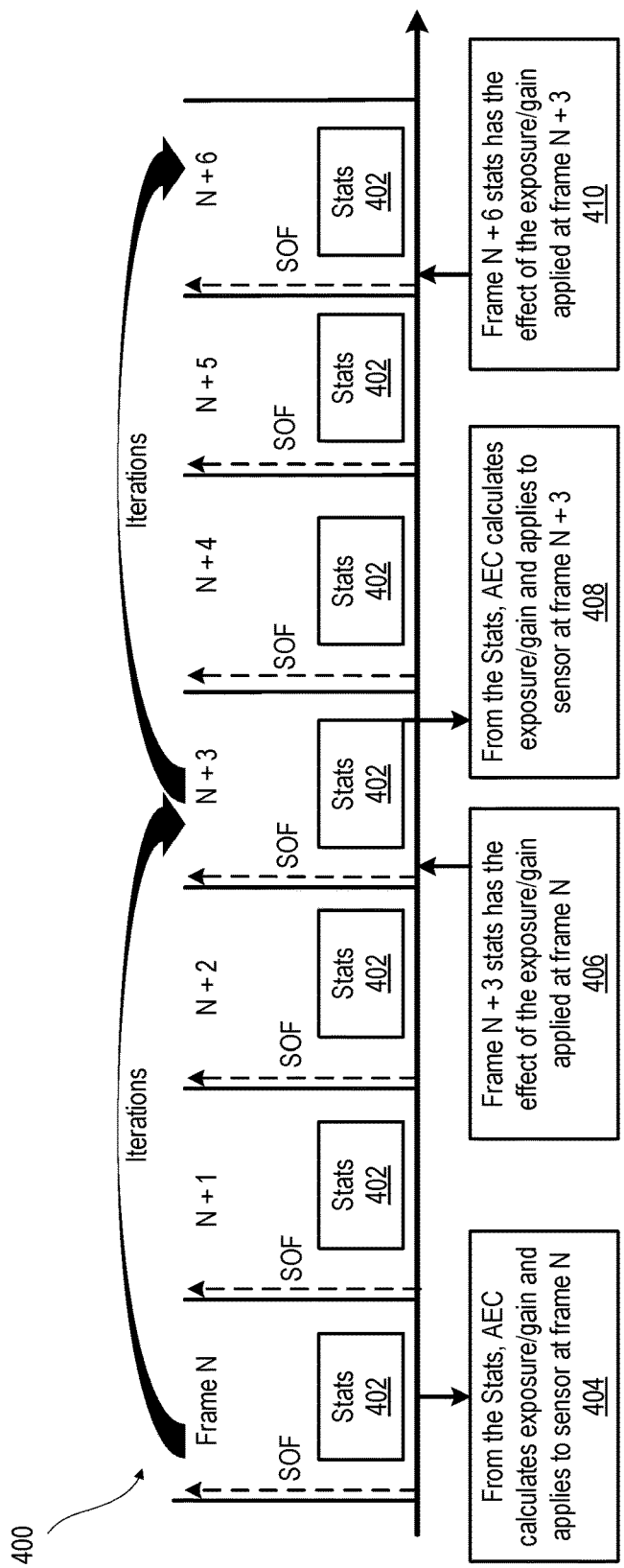
FIG. 4 illustrates a timing diagram of a generally-known example automatic exposure control (AEC) process implemented by controls of one of the dual cameras of the electronic device, according to one or more embodiments.

FIG. 4 illustrates a timing diagram 400 of two iterations of a generally-known AEC convergence procedure performed by a single camera over seven frames N to N+6. At a start of frame (SOF) of each frame, statistics (stats) 402 are accessed. From the stats 402 in frame N, AEC calculates exposure and gain and applies the result to a sensor (block 404). Due to sensor hardware limitations, sensor needs two (2) additional frames to make exposure/gain take effect. Thus, after AEC calculates exposure/gain settings in frame N and applies to sensor, the calculated exposure/gain settings provide a resulting change in frame N+3 (block 406). For AEC convergence procedure, changes in a closed-loop control settings require that the changes have taken effect in the stats 402. Before calculating and applying new exposure/gain to the sensor, AEC thus waits for the stats 402 to reflect the change in frame N+3 to recalculate and apply new exposure/gain settings to sensor (block 408). The result of the recalculation and application of exposure/gain settings in frame N+3 takes effect in frame N+6 (block 410). In a typical situation, AEC performs eight (8) iterations over twenty-four (24) frames in order to converge. Although the three frames per iteration is typical, other hardware constraints can exist. In addition, the number of iterations required to converge can vary depending on particular hardware performance as well as ambient lighting conditions. For whatever level of AEC convergence performance is provided by a particular camera hardware, the present innovation can significantly reduce the time to converge without degrading an image preview quality.

Figure 5:
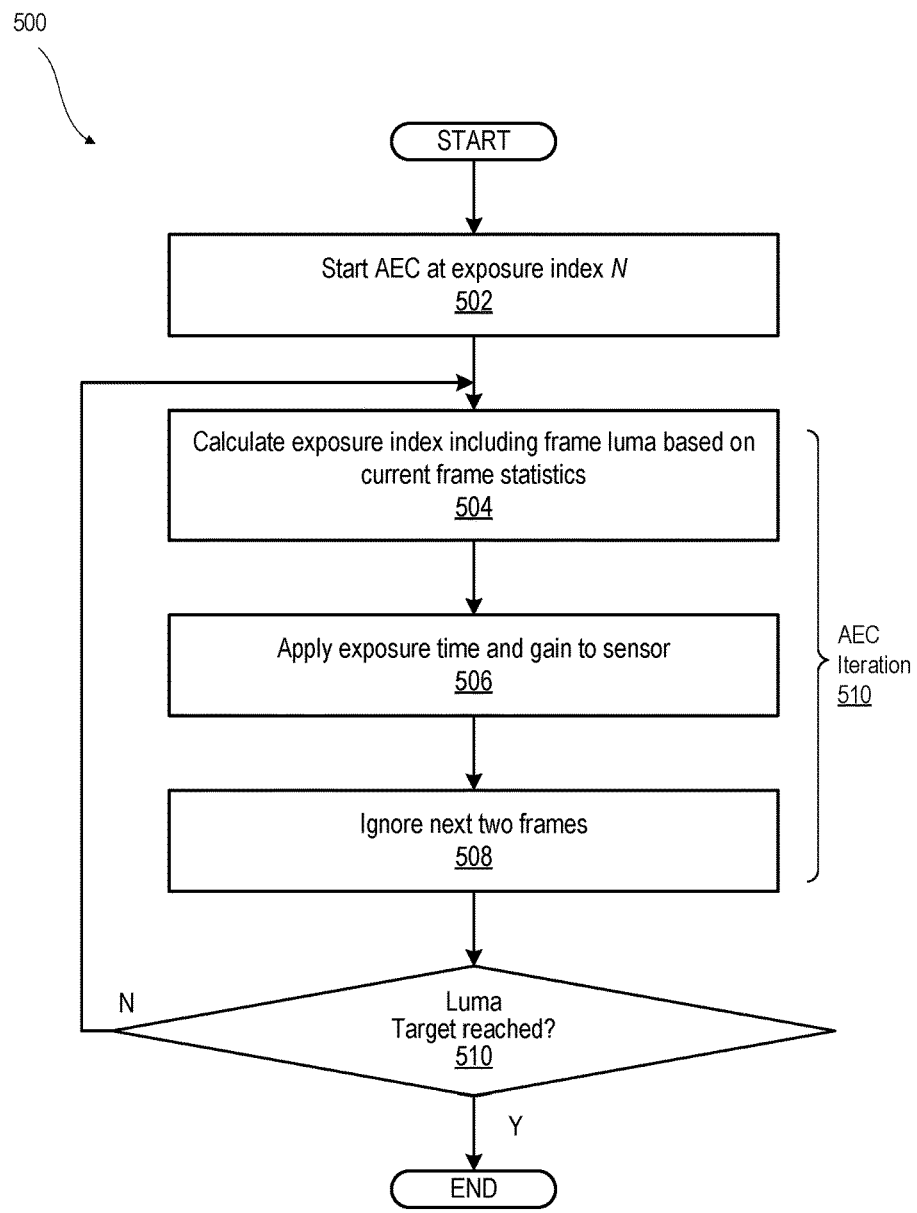
FIG. 5 illustrates a flow diagram of performing AEC, according to one or more embodiments.

FIG. 5 illustrates a method 500 of performing AEC convergence. AEC convergence procedures runs on stats such as Bayer Grid (BG) stats for a bayer sensor. For example, method 500 can start AEC at an index N (block 502). AEC calculates an exposure index including a frame luma for each frame (block 504). The calculation includes comparing current frame luma with pre-defined luma target that is tunable. Based on the difference between current frame luma and the luma target, AEC calculates exposure index adjustment. From exposure index, AEC gets exposure time and gain from exposure table. AEC applies the exposure time and gain to the sensor (block 506). AEC leaves the exposure and gain the same for the next two frames (block 508). An AEC iteration 510 concludes after three frames. AEC makes a determination of whether the AEC is converged. In one or more embodiments, determining convergence can be based on determining whether a luma target has been reached. (decision block 512). In response to determining that the luma target has been reached, method 500 ends. In response to determining that the luma target has not been reached, method 500 returns to block 504 to continue the converging process.

Figure 6:
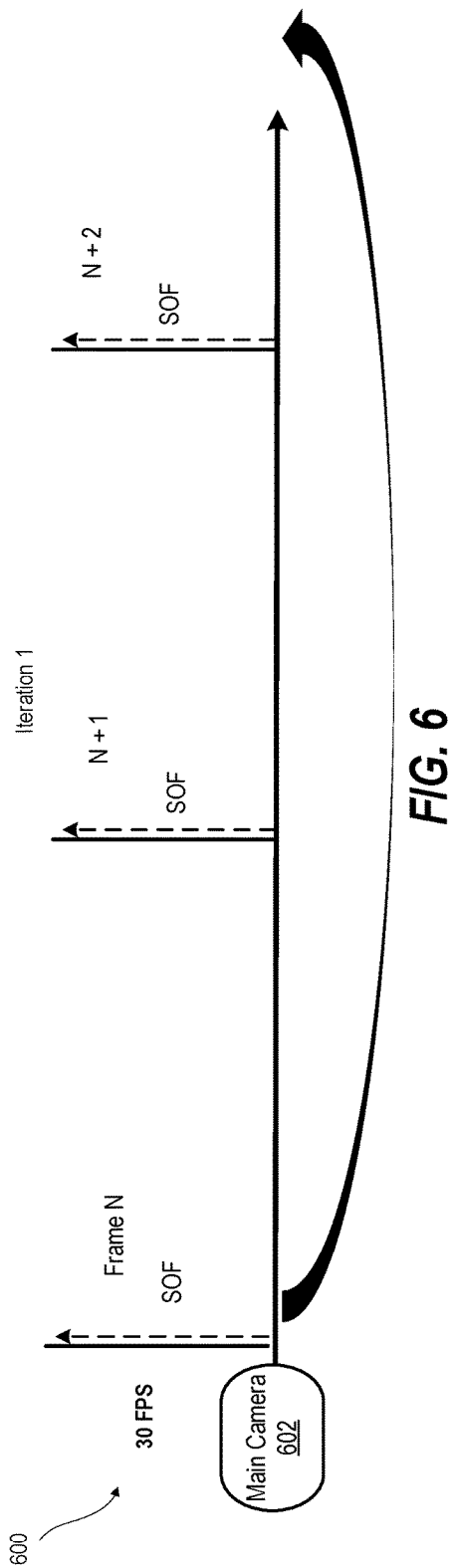
FIG. 6 illustrates a timing diagram of a first iteration of performing AEC by a main camera of the electronic device operating at a first frame rate, according to one or more embodiments.
Figure 7:
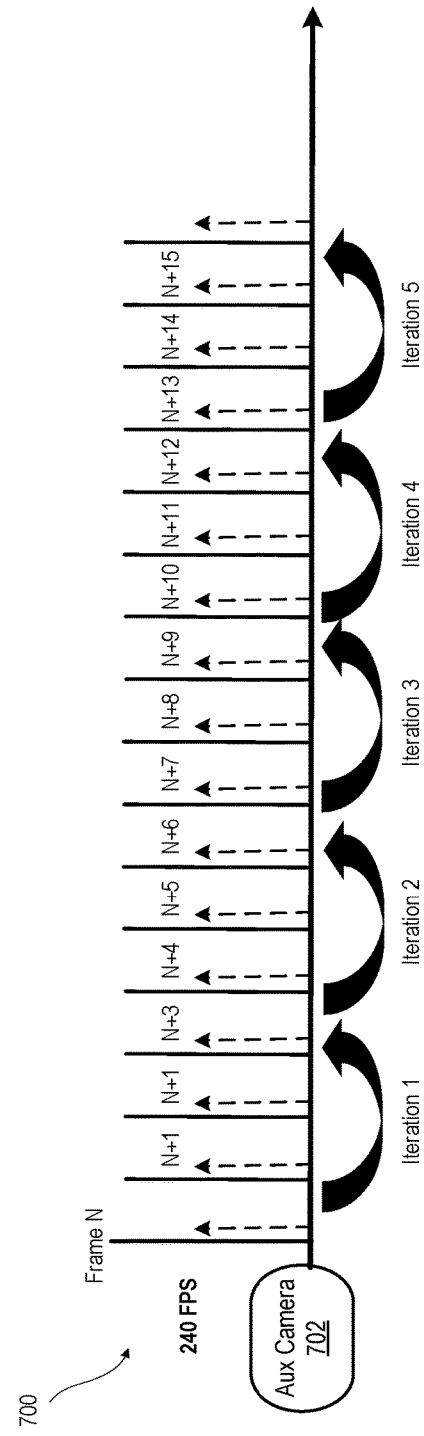
FIG. 7 illustrates a timing diagram of several iterations of concurrently performing AEC by an auxiliary camera of the electronic device operating at a faster second rate than the main camera, according to one or more embodiments.

FIG. 6 illustrates a timing diagram 600 of a main camera 602 during a first iteration of AEC convergence procedure operating at a normal frame rate of 30 FPS for normal lighting conditions. For low light conditions, the frame rate can decrease to 10 FPS for less noise. The fewer number of photons in low light conditions tends to create a grainy, noisy image that is lessoned by allowing a longer period of time to sample the light. FIG. 6 illustrates a small number of frames performed at a normal frame rate or low light frame rate that is insufficient for convergence by a single camera. The main camera in this situation can benefit from assistance with AEC convergence procedure that is depicted in FIG. 7. With continued reference to FIG. 6, the camera references an exposure table for an initial setting to balance exposure time and noise. Speeding up the frame rate for faster convergence is not practical with just one camera due to a single camera also being used concurrently for a preview image or images on a user interface (UI). Faster frame rates tend to add significant amount of noise to the image. Upon a change in the frame rate, a change in sensor read-out mode causes flickering that degrades user experience.

FIG. 7 illustrates a timing diagram 700 of an auxiliary camera 702 that executes concurrently with the main camera 602 (FIG. 6) but at a faster frame rate such as 240 FPS in 2×2 binning mode. In the exemplary embodiment, the auxiliary camera 702 (FIG. 7) is operating at eight times (8×) the rate of main camera 602 (FIG. 6) by executing 15 frames (5 iterations) in the time of 2 frames (⅔ of an iteration) respectively. Consequently, auxiliary camera 702 converges eight times (8×) faster than at the normal rate. After the auxiliary camera AEC settles (converges), AEC syncs to the main camera 602 (FIG. 6) by providing exposure index, line count and gain. Main camera 602 (FIG. 6) uses the exposure index, line count and gain for a sensor of the main camera after Image Quality (IQ) matching. It is appreciated that the use of an example frame rate of 240 FPS is not intended to imply any limitations on the disclosure, and the specific FPS is just an example. In other instances, generally known sensors such as IMX386 have maximum frame rate of 160 FPS without field of view (FOV) loss. More recent hardware designs tend to have faster frame rate capabilities than older designs.

Figure 8:
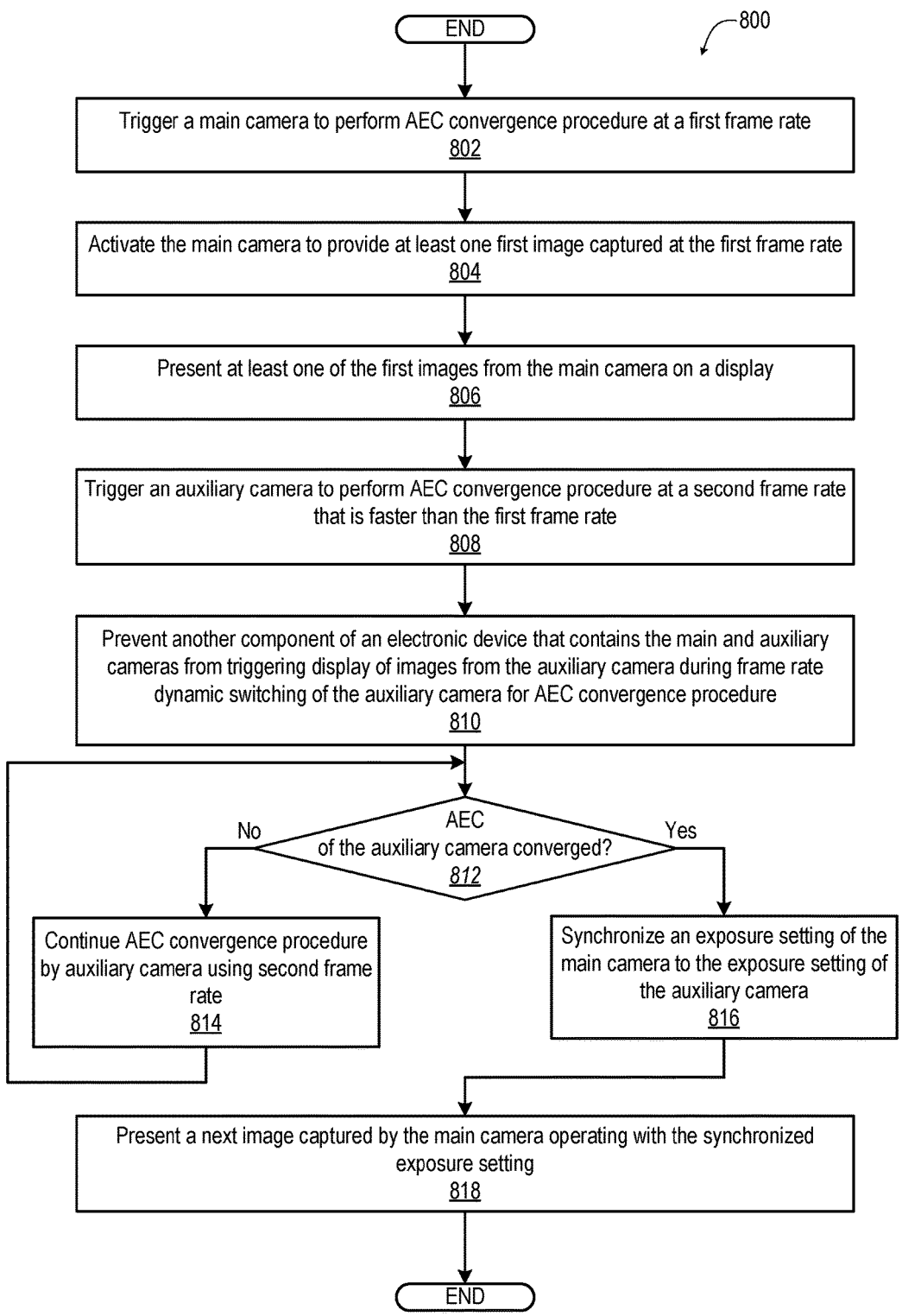
FIG. 8 illustrates a flow diagram of a method for performing AEC in an electronic device having dual cameras, in accordance with one or more embodiments.

FIG. 8 illustrates a method 800 of performing an AEC convergence procedure with dual cameras. Faster AEC convergence is achieved by using a faster second frame rate of an auxiliary camera to settle at an exposure setting, referred herein as convergence. One example of convergence is reaching a luma target. A normal first frame rate of a main camera is selected to provide a better image on a user interface during AEC convergence procedure of the auxiliary camera. In one or more embodiments, the method 800 includes triggering a main camera to perform AEC convergence procedure at a first frame rate (block 802). The method 800 includes activating the main camera to provide at least one first image captured at the first frame rate (block 804). The method 800 includes presenting at least one of the first images from the main camera on a display (block 806). The method 800 includes triggering an auxiliary camera to perform AEC convergence procedure at a second frame rate that is faster than the first frame rate for the case of main camera AEC not converged (block 808). In one or more embodiments, the first frame rate is a normal frame rate, such as 30 FPS or below. The second frame rate can be the highest frame rate supported by the auxiliary camera, such as 240 FPS or above. In one or more embodiments, the method 800 includes preventing/blocking another component of an electronic device that contains the main and auxiliary cameras from triggering display of images from the auxiliary camera during frame rate dynamic switching of the auxiliary camera for AEC convergence procedure (block 810). For example, images from the auxiliary camera are not displayed when switching from the first frame rate to the second frame rate, when operating at the second rate, and when switching from the second rate to the first frame rate. The method 800 includes determining whether the AEC of the auxiliary camera has converged (decision block 812). In response to determining that the AEC of the auxiliary camera has not converged, the method 800 includes continuing AEC convergence procedure by auxiliary camera using the second frame rate (block 814). Then the method 800 returns to decision block 810 to check again to see if the AEC has converged. In response to determining that the AEC of the auxiliary camera has converged using the second frame rate in decision block 812, the method 800 includes synchronizing an exposure setting of the main camera to the exposure setting of the auxiliary camera for the case of main camera AEC not converged by its own AEC convergence procedure (block 816). The method 800 includes presenting a next image captured by the main camera operating with the synchronized exposure setting (block 818). Then the method 800 ends.

In one or more embodiments, an auxiliary camera can selectively improve AEC convergence by a main camera. For example, the method 800 includes receiving a trigger to activate the main camera. In response to receiving the trigger, the method 800 includes concurrently activating the main camera to operate at the first frame rate and the auxiliary camera to operate at the second frame rate for AEC convergence procedure. In response to determining that the AEC of the auxiliary camera has converged, the method 800 includes operating the main and auxiliary cameras at the first frame rate. Defaulting to a lower frame rate such as a normal frame rate allows the auxiliary camera to be used for other camera functions when not needed to assist the main camera with faster AEC convergence.

In one or more embodiments, an auxiliary camera can be dedicated to improving AEC convergence by a main camera. For example, the method 800 includes determining an initial exposure setting of the main camera in response to receiving a trigger to activate the main camera. The method 800 includes performing a first iteration of AEC convergence procedure for the main camera of one or more frames operating at the first frame rate. The method 800 includes determining whether the AEC of the main camera has converged. In response to determining that the AEC of the main camera has not converged, the method 800 includes triggering the auxiliary camera to perform AEC convergence procedure at the second frame rate while the main camera concurrently operates at the first frame rate. In response to the AEC of the auxiliary camera converging and subsequent to synchronizing the exposure setting with the main camera, the method 800 includes operating the auxiliary camera at the first frame rate. For clarity, the auxiliary camera is described as returning to a first frame rate, such as a normal frame rate. Depending upon other uses or hardware constraints of the auxiliary camera, the auxiliary camera can switch to other preset or commanded frame rates.

Figure 9:
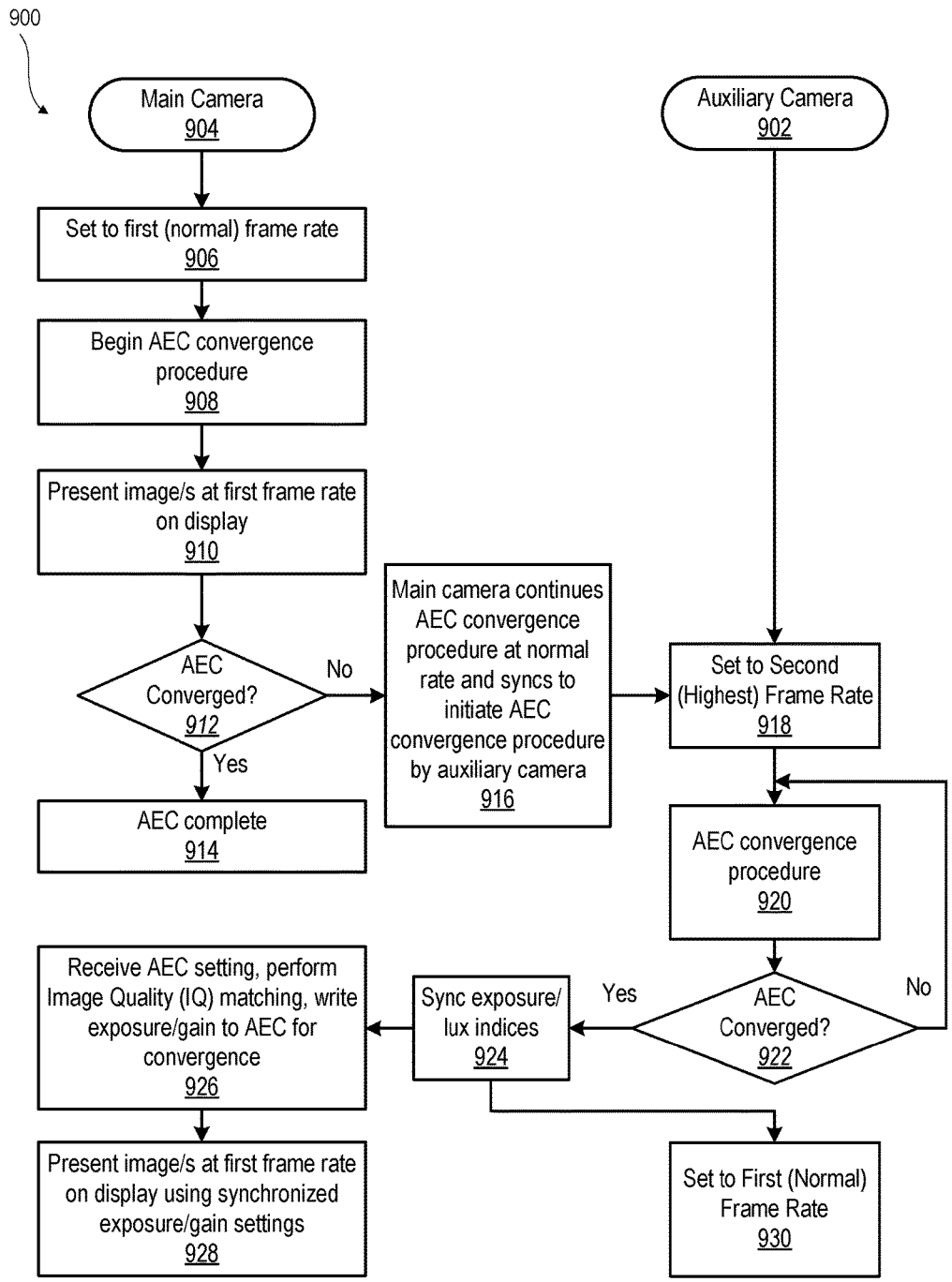
FIG. 9 illustrates a message flow diagram of selectively operating the auxiliary camera at the faster second frame rate for faster AEC, according to one or more embodiments.

FIG. 9 illustrates a message flow diagram 900 for a dedicated auxiliary camera 902 improving speed for AEC convergence by a main camera 904. Main camera 904 is set to a first frame rate, which can be a normal frame rate (block 906). Main camera 904 begins AEC convergence procedure (block 908). As received with the current AEC settings, main camera 904 can present images at the first frame rate on a display (block 910). Main camera 904 determines whether AEC has converged (decision block 912). In certain instances, default or previously determined settings for AEC can result in rapid convergence. Thus, in response to determining that AEC has converged, AEC convergence procedure is complete (block 914). However, consider instances of an initial activation or an instance of an abrupt scene change in which the main camera 904 does not converge in a short period of time, such as within one iteration. In response to determining that the main camera 904 has not converged in decision block 912, main camera continues AEC convergence procedure at its normal frame rate and synchronization (sync) is initiated between main camera 904 and auxiliary camera 902 (block 916). For example, a processor of an electronic device can monitor main camera 904. In another example, main camera 904 can initiate the sync. Auxiliary camera 902 sets operation to a second frame rate, such as a high frame rate supported by the auxiliary camera 902 (block 918). Auxiliary camera 902 begins AEC convergence procedure (block 920). Auxiliary camera 902 determines whether AEC has converged (decision block 922). In response to determining that AEC has not converged, auxiliary camera 902 returns to decision block 922 to continue AEC convergence procedure. In response to determining that AEC has converged in decision block 924, auxiliary camera 902 syncs exposure and lux indices to main camera 904 for the case of main camera not converged by its own AEC convergence procedure (block 924). Main camera 904 receives AEC setting, performs Image Quality (IQ) matching, and writes exposure/gain to AEC for convergence (block 926). IQ encompasses all aspects of how a camera and lens capture a scene. Differences in image quality may be attributed to different parts of the camera or lens. Examples of image quality aspects that can be matched include image noise, dynamic-range, color-depth, color-accuracy, sharpness, resolution, distortion, vignetting, aberrations, flare, etc. IQ differences between the main and auxiliary camera 904, 902 can be addressed by appropriately translating the synchronization statistics. Image/s from the main camera 904 taken at the first frame rate with the synchronized exposure/gain settings are presented on a display (block 928). With the main camera 904 synchronized, the auxiliary camera 902 can be set to the first frame rate for normal operation or for other purposes (block 930).

Figure 10:
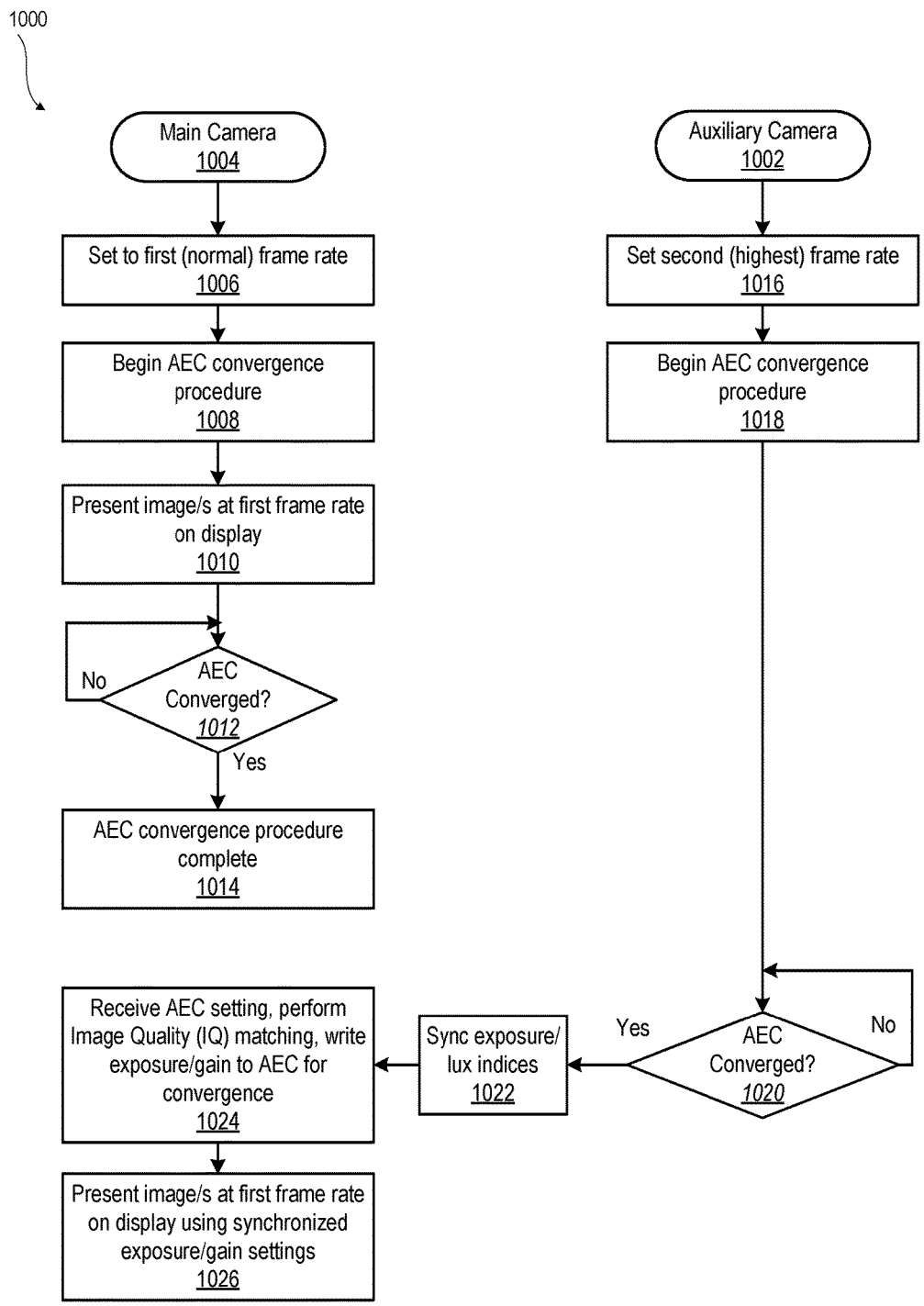
FIG. 10 illustrates a message flow diagram of dedicated operation of the auxiliary camera at the faster second frame rate for faster AEC, according to one or more embodiments.

FIG. 10 illustrates a message flow diagram 1000 for an auxiliary camera 1002 selectively used to improve speed for AEC convergence by a main camera 1004. Main camera 1004 is set to a first frame rate, which can be a normal frame rate (block 1006). Main camera 1004 begins AEC convergence procedure (block 1008). As received with the current AEC settings, main camera 1004 can present images at the first frame rate on a display (block 1010). Main camera 1004 determines whether AEC has converged (decision block 1012). In response to determining that AEC has not converged, main camera 1004 returns to decision block 1012 to continue AEC convergence procedure. In response to determining that the AEC has converged for the main camera, then AEC convergence procedure is complete (block 1014). In an illustrative example, main camera 1004 continues in this loop while the auxiliary camera 1002 supports faster AEC convergence. Without waiting to be triggered, auxiliary camera 1002 is set to the second frame rate, such as the high frame rate supported by the auxiliary camera 1002 (block 1016). Auxiliary camera 902 begins AEC convergence procedure (block 1018). In one or more embodiments, auxiliary camera 902 is dedicated to performing fast AEC convergence to improve performance of the main camera 904. Auxiliary camera 1002 determines whether AEC has converged (decision block 1020). In response to determining that AEC has not converged, auxiliary camera 1002 returns to decision block 1020 to continue AEC convergence procedure. In response to determining that AEC has converged, auxiliary camera 1002 syncs exposure and lux indices to the main camera 1004 for the case of main camera AEC not converged by its own AEC convergence procedure (block 1020). Main camera 1004 receives AEC setting, performs Image Quality (IQ) matching, and writes exposure/gain to AEC for convergence (block 1024). Performing IQ matching addresses differences between the main and auxiliary camera 1004, 1002. Image/s from the main camera 1004 taken at the first frame rate with the synchronized exposure/gain settings are presented on a display (block 1026).

In one or more embodiments, an initial fixed start exposure can always begin with a very short exposure. If the camera is launched at a bright light scene, the short exposure matches the bright light scene. Thus, no overblown preview image is presented, if the camera is launched at a low light scene, the faster AEC convergence enables the exposure to quickly increase to the point that the AEC is settled. A short dim preview can be deemed less distracting than an overblown preview. The fast frame rate of the auxiliary camera is not previewed so the noise and flickering is not an issue. For FPS switch, such as from normal FPS to high FPS, there is one (1) frame overhead. As compared to 18+ frames for AEC convergence, this one (1) frame overhead is acceptable. Fast AEC convergence benefits autofocus (AF) and automatic white balance (AWB) color convergence, and improves a key performance indicator (KPI) of camera launch to readiness. The fast AEC convergence provides a quick response to scene change. Thus, fewer shots are missed. The fast AEC convergence benefits preview UI user experience. The fast AEC convergence also benefits video recording user experience by removing the dark/overblown transition when a scene changes.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
triggering a main camera to perform automatic exposure control (AEC) convergence procedure at a first frame rate;
activating the main camera to provide at least one first image captured at the first frame rate;
presenting the at least one first images from the main camera on a display;
triggering an auxiliary camera to perform AEC convergence procedure at a second frame rate that is faster than the first frame rate;
determining whether the AEC of the auxiliary camera has converged;
in response to determining that the AEC of the auxiliary camera has converged using the second frame rate, synchronizing an exposure setting of the main camera to the exposure setting of the auxiliary camera; and
presenting a next image captured by the main camera operating with the synchronized exposure setting.

2. The method of claim 1, further comprising:
determining an initial exposure setting of the main camera in response to receiving a trigger to activate the main camera; and
performing a first iteration of AEC convergence procedure for the main camera of one or more frames operating at the first frame rate;
determining whether the AEC of the main camera has converged;
in response to determining that the AEC of the main camera has not converged, triggering the auxiliary camera to perform AEC convergence procedure at the second frame rate while the main camera concurrently operates at the first frame rate; and
in response to the AEC of the auxiliary camera converging and subsequent to synchronizing the exposure setting with the main camera, operating the auxiliary camera at the first frame rate.

3. The method of claim 1, further comprising:
receiving a trigger to activate the main camera;
in response to receiving the trigger, concurrently activating the main camera to operate at the first frame rate and the auxiliary camera to operate at the second frame rate for AEC convergence procedure; and
in response to determining that the AEC of the auxiliary camera has converged, operating the main and auxiliary cameras at the first frame rate.

4. The method of claim 1, wherein:
the first frame rate is within a range of 30 frames per second (FPS) or below; and
the second frame rate is a highest frame rate supported by the auxiliary camera.

5. The method of claim 1, further comprising preventing another component of an electronic device that contains the main and auxiliary cameras from triggering display of images from the auxiliary camera during frame rate dynamic switching of the auxiliary camera for AEC convergence procedure from the first frame rate to the second frame rate, operating at the second rate, and from the second rate to the first frame rate.

6. An electronic device comprising:
a main camera having a first field of view and controlled by a main camera control that:
performs automatic exposure control (AEC) convergence procedure at a first frame rate in response to receiving a trigger;
activates the main camera to provide at least one first image captured at the first frame rate; and
an auxiliary camera having a similar field of view as the main camera and controlled by an auxiliary camera control that performs AEC convergence procedure in response to receiving a next trigger;
a display on which the at least one image captured by the main camera is presented; and
a processor subsystem in communication with the display, the main camera control and the auxiliary camera control and which executes a dual camera control module, which causes the processor subsystem to:
trigger the main camera control to perform AEC convergence procedure at a first frame rate;
present the at least one first image on the display;
trigger the auxiliary camera control to perform AEC convergence procedure at a second frame rate that is faster than the first frame rate;
access current frame statistics generated by performing AEC by the auxiliary camera control;
determine whether the AEC of the auxiliary camera control has converged based on the current frame statistics, including an exposure setting;
in response to determining that the AEC of the auxiliary camera control has converged, synchronize an exposure setting of the main camera control to the exposure setting of the auxiliary camera control of the auxiliary camera; and
present, on the display, a next image captured by the main camera operating with the synchronized exposure setting.

7. The electronic device of claim 6, wherein:
the faster second rate is selected for faster AEC convergence by the auxiliary camera than using the slower first rate of the main camera; and
the slower first rate of the main camera is selected to provide a better image on a user interface during AEC than the faster second rate.

8. The electronic device of claim 6, wherein:
the main camera control determines: an initial exposure setting of the main camera in response to receiving a trigger to activate the main camera; and performs a first iteration of AEC convergence procedure for the main camera of one or more frames operating at the first frame rate; and
the processor, executing the dual camera control module:
determines whether the main camera control performing AEC for the main camera has converged;
in response to determining that the main camera control performing AEC for the main camera has not converged, triggers the auxiliary camera control of the auxiliary camera to perform AEC convergence procedure operating at the second frame rate while the main camera concurrently operates at the first frame rate; and
operates the auxiliary camera at the first frame rate subsequent to converging and synchronizing the exposure setting with the main camera.

9. The electronic device of claim 6, wherein the processor:
receives a trigger to activate the main camera;
in response to receiving the trigger, concurrently activates the main camera to operate at the first frame rate and the auxiliary camera to operate at the second frame rate for AEC convergence procedure; and in response to determining that the AEC of the auxiliary camera has converged, operates the main and auxiliary cameras at the first frame rate.

10. The electronic device of claim 6, wherein:
the first frame rate is 30 frames per second (FPS) or below; and
the second frame rate is a highest frame rate supported by the auxiliary camera.

11. The electronic device of claim 6, wherein the processor prevents another component of the electronic device from triggering display of images from the auxiliary camera during frame rate dynamic switching of the auxiliary camera for AEC convergence procedure from the first frame rate to the second frame rate, operating at the second rate, and from the second rate to the first frame rate.

12. A computer program product comprising:
a computer readable storage device; and
program code on the computer readable storage device that when executed by a processor associated with an electronic device having a main camera and at least one auxiliary camera, the program code enables the electronic device to provide the functionality of:
triggering a main camera to perform automatic exposure control (AEC) convergence procedure at a first frame rate;
activating the main camera to provide at least one first image captured at the first frame rate;
presenting the at least one first images from the main camera on a display;
triggering an auxiliary camera to perform AEC convergence procedure at a second frame rate that is faster than the first frame rate;
determining whether the AEC of the auxiliary camera has converged;
in response to determining that the AEC of the auxiliary camera has converged, synchronizing an exposure setting of the main camera to an exposure setting of the auxiliary camera; and
presenting a next image captured by the main camera operating with the synchronized exposure settings.

13. The computer program product of claim 12, wherein the program code enables the electronic device to provide the functionality of:
determining an initial exposure setting of the main camera in response to receiving a trigger to activate the main camera; and
performing a first iteration of AEC convergence procedure for the main camera of one or more frames operating at the first frame rate;
determining whether the AEC of the main camera has converged;
in response to determining that the AEC of the main camera has not converged, triggering the auxiliary camera to perform AEC convergence procedure at the second frame rate; and
in response to the AEC of the auxiliary camera converging and subsequent to synchronizing the exposure setting with the main camera, operating the auxiliary camera at the first frame rate.

14. The computer program product of claim 12, wherein the program code enables the electronic device to provide the functionality of:
receiving a trigger to activate the main camera; and
in response to receiving the trigger, concurrently activating the main camera to operate at the first frame rate and the auxiliary camera to operate at the second frame rate for AEC convergence procedure; and
in response to determining that the AEC of the auxiliary camera has converged, operating the main and auxiliary cameras at the first frame rate.

15. The computer program product of claim 12, wherein:
the first frame rate is within a range of 30 frames per second (FPS) or below; and
the second frame rate is a highest frame rate supported by the auxiliary camera.

16. The computer program product of claim 12, wherein the program code enables the electronic device to provide the functionality of:
preventing another component of an electronic device that contains the main and auxiliary cameras from triggering display of images from the auxiliary camera during frame rate dynamic switching of the auxiliary camera for AEC convergence procedure from the first frame rate to the second frame rate, operating at the second rate, and from the second rate to the first frame rate.

\* \* \* \* \*